UNITED STATES PATENT OFFICE.

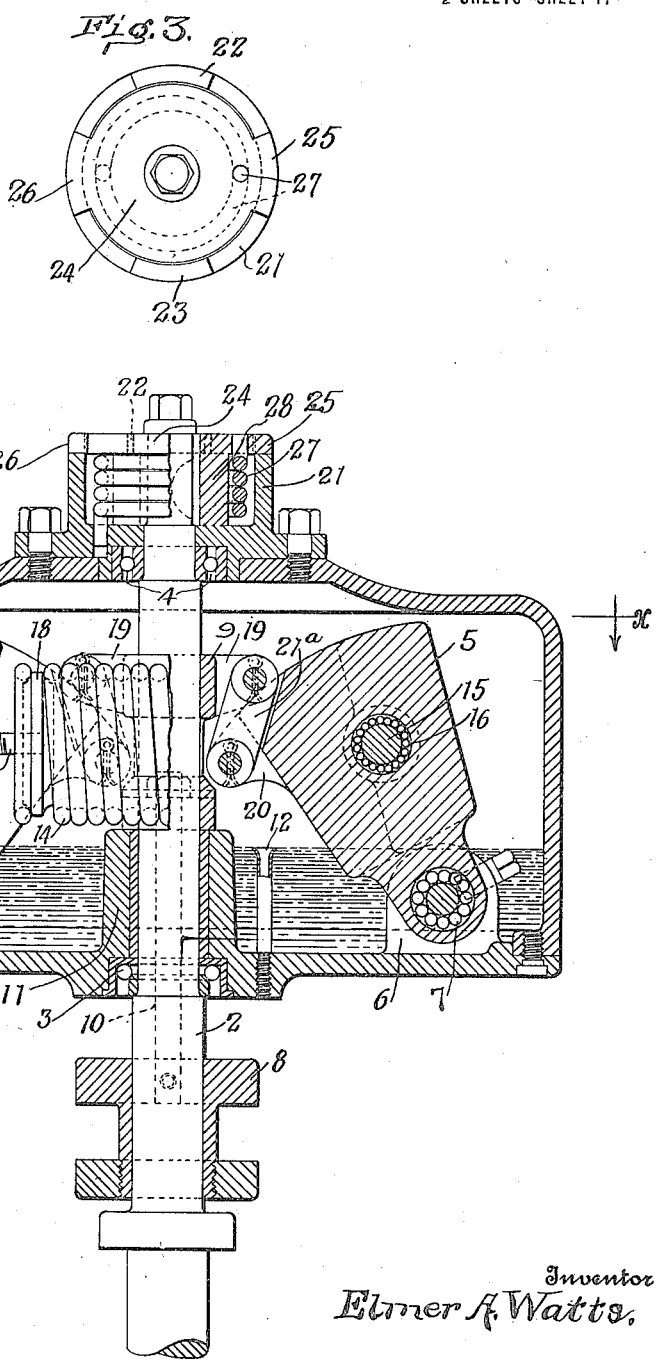

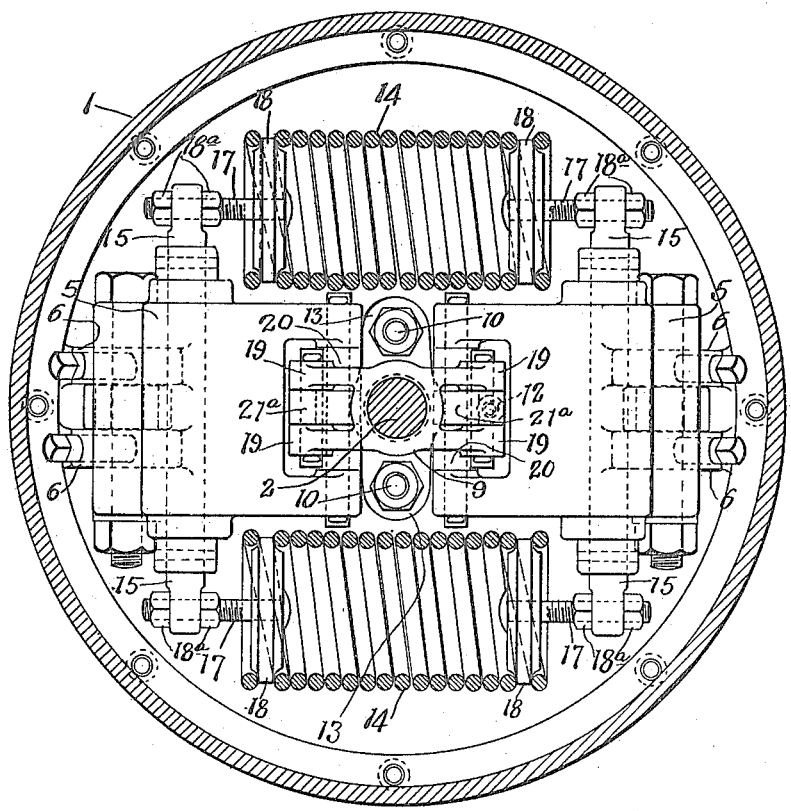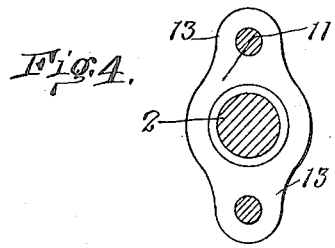

ELMER A. WATTS, OF SPRINGFIELD, OHIO.

GOVERNOR.

1,208,421.  Specification of Letters Patent.  Patented Dec. 12, 1916.

Application filed October 13, 1914. Serial No. 866,496.

*To all whom it may concern:*

Be it known that I, ELMER A. WATTS, a citizen of the United States, residing at Springfield, in the county of Clark and State of Ohio, have invented certain new and useful Improvements in Governors, of which the following is a specification, reference being had therein to the accompanying drawing.

This invention relates to governors for engines.

The invention is applicable to engines of various kinds, but is particularly applicable to gas engines, and I will herein describe an embodiment of the invention designed for use with such an engine.

The fluid or gas is admitted to a gas engine under pressure, this pressure being created by the suction or partial vacuum formed within the cylinder of the engine by the movement of the piston away from the inlet port. Inasmuch as the displacement of the piston within the cylinder is the same under all conditions of load, it will be readily understood that the pressure or suction acting on the fluid to cause it to enter the cylinder is much greater when the inlet opening has been throttled down to a relative small size, as when the engine is running at high speed, than it will be when the valve is wide open, as when the engine is operating under a heavy load. Consequently, a given movement of the valve when the same is partially closed will have a greater relative effect upon the gas entering the cylinder than the same movement will have when the valve is wide open.

The object of the invention is to provide a governor which will be so constructed that a given variation of speed, and, consequently, a given movement of the governor, will have a less effect on the valve when the latter is in a partially closed position than it will have when the valve is in its wide open position, thus providing for a differential movement of the valve which will serve to quickly control the engine under all variations of speed and also to prevent marked fluctuations in the feed of gas to the engine when the latter is operating at high speed, as does result when the valve is moved a uniform distance for a given movement of the governor at all speeds of the engine.

To this end it is a further object of the invention to so construct the governor that it will, in all positions, offer the same resistance to the action of centrifugal force.

It is a further object of the invention to provide a resilient driving connection between the governor and the engine, thereby causing a smooth, uniform movement of the governor and preventing the valve from being abnormally operated by sudden movements of the engine, as in starting.

A further object is to provide a device embodying these characteristics which will be very simple in its construction, positive in its operation, and will be easily maintained in working condition.

In the accompanying drawings Figure 1 is a vertical sectional view taken centrally through a governor embodying my invention, showing the governor weights partly in section and partly in elevation; Fig. 2 is a transverse sectional view taken on the line $x$—$x$ of Fig. 1, looking in the direction of the arrows; Fig. 3 is a detail view of the connection between the resilient driving device and the governor casing; and Fig. 4 is a detail view of the boss through which the spindle and connecting rods pass.

In these drawings I have illustrated one embodiment of my invention and have shown the same as comprising a casing 1 which is cylindrical in shape and is fluid-tight so that it may be utilized as an oil receptacle and the operative parts therein caused to work in an oil bath. This casing is mounted upon a driving spindle 2, which is connected by suitable gearing or otherwise with a driven part of the engine, such as the engine shaft. The casing is connected with the spindle in such a manner that it will revolve therewith, but may have a limited rotary movement relative thereto, as hereinafter described, this being permitted by the ball bearings 3 and 4.

Mounted within the casing are two weights adapted to be moved away from the axis of rotation of the casing by centrifugal force when the casing is rotated. As here shown, these weights are in the nature of weighted arms 5 pivotally supported at their lower ends at points removed from the axis of rotation of the casing, and, in the present instance, arranged near the outer wall of the cylindrical casing. In the present construction, the bottom wall of the casing is provided with lugs 6 between which the lower ends of the arms extend and to which they are pivotally connected, the pivotal connection being preferably provided with an anti-friction bearing, as indicated at 7. These weights are connected with a suitable valve actuating device in such a manner that the outward movement of the weights will cause a gradually decreasing movement of the valve. As here shown, the valve actuating device comprises a collar 8 which is slidably mounted on the spindle beneath the casing and may be operatively connected with the valve in any suitable manner. Such connections are common in the art and it is unnecessary to show or describe the same here. A second collar 9 is slidably mounted upon the spindle within the casing and is connected with the collar 8 by means of rods 10 which extend through the bottom of the casing and are secured at their opposite ends with the respective collars. To prevent the leakage of oil about the rods and spindle, and to avoid the necessity of providing stuffing boxes, the bottom wall of the casing is provided with an upwardly extending hub or boss 11, the upper end of which projects beyond the normal level of the oil in the casing, this level being determined by an outlet pipe 12. The hub, or boss, 11, has laterally projecting extensions 13, through which the rods 10 extend, and in which they have free movement. Suitable connections are provided between the weighted arms 5 and the collar 9 of the valve actuating device to cause movement to be transmitted from the weighted arms to this device. In the present arrangement the pivotal supports for the weighted arms are, as above explained, arranged some distance from the axis of rotation of the casing and the arms have their centers of gravity on the inner sides of their axes and are so arranged that at no time during their normal operation will their centers of gravity pass beyond their axes. Consequently, the weight of the arms is always opposed to the centrifugal movement thereof. It will be understood that the weights are provided with springs which also resist their outward movement. In the present instance two such springs are provided, as shown at 14, and the springs are connected at their opposite ends with the respective arms. These connections are such as to practically eliminate friction due to the change of the relative positions of the weights and springs. To this end the weighted arms have mounted therein spindles or shafts 15, which are preferably mounted in roller bearings 16 and are provided at their ends with flattened extensions through which extend rods 17. Nuts 18$^a$ arranged on the opposite sides of the ends of the shafts 10 hold the respective rods 17 in their adjusted positions. These rods 17 are provided with plates 18 adapted to extend between the coils of the springs, at the respective ends thereof, and thus connect the rods to the springs and to the weighted arms. The connections between the weighted arms 5 and the valve actuating device are such that the first outward movements of these arms will impart a relatively great movement to the valve actuating device while the last portion of the movements of the arms will impart a relatively small movement to the valve actuating device, and consequently, to the valve. As here shown, when the weighted arms are in their idle or innermost positions their inner edges extend close to the collar and slightly beneath lugs 19 projecting from the respective sides of the collar. The inner sides of the arms are also provided with lugs, as shown at 20, and the lugs 19 and 20 are connected by means of links 21$^a$. It will be apparent that the first outward movement of the arms will carry the lugs 20 upward along an arc which extends at a sharp angle to the vertical, thereby causing the links and the collar 9 to move upward a relatively great distance. As the weighted arms continue to travel outward the arc along which the lugs 20 travel approaches more and more closely to the horizontal, and, consequently, the upward movement of the lugs becomes less and less in proportion to the outward movement of the arms. Further, during this latter part of the movement of the arms, the links have passed their vertical position and the upward thrust is not so direct as it was during the earlier part of the movement of the arms. Consequently, when the engine is operating at a high speed and the weighted arms are thrown outward to their outermost positions any variation in the speed of the engine which will permit of or cause a movement of the arms will have a relatively small effect upon the valve, because only a small part of the movement of the arms will be transmitted to the valve actuating device. It will be noted that when the weighted arms are in their normal or idle positions the pivotal connection between each arm and its link lies within a line drawn through the axis about which the weighted arm moves and the pivotal connection of the link to the valve actuating device. The movement of each link is so limited that the pivotal connection between the link of the weight will not, at any time during the normal operation of the governor, be carried beyond this line.

In the present construction the weights and casing are so arranged that the weights will engage the casing when the links lie substantially in the lines mentioned, at which time the valve actuating device has ceased to move.

A resilient driving connection is preferably interposed between the spindle 2 and the governor casing. This connection, as here shown, comprises a spring connected at one end with the casing and at the other end with the spindle, the parts being provided with positive stops to limit their relative movement and to form positive connections between them. As here shown, the spindle 2 projects through the top of the casing 1 and is inclosed within a supplemental casing or boss 21 which rises above and is rigidly secured to the top of the governor casing. This boss is provided on its upper edge with two diametrically opposite projections 22 and 23. These projections are comparatively narrow and thus form between them wide recesses. Rigidly secured to the spindle 2 is a top plate 24 of a diameter approximately equal to the interior diameter of the boss 21, and provided with diametrically opposite lateral projections 25 and 26 which extend into the respective recesses formed between the projections 22 and 23 on the boss. A spring 27 is coiled about the spindle within the boss 21 and is secured at one end to the top plate 24 and at the other end to the governor casing. In the present instance, this connection is formed through the medium of the bottom wall of the supplemental casing or boss. The top plate may be secured to the spindle in any suitable manner, but, as here shown, it is provided with a hub or sleeve portion 28 which extends about the spindle, within the coiled spring 27, and is keyed to the spindle. The arrangement of the spring is such that when the parts are idle the projections 25 and 26 will lie substantially midway between the projections 22 and 23. When movement is imparted to the spindle, it will move relatively to the governor casing until the spring has been compressed sufficiently to overcome the inertia of the casing or to permit the projections on the top plate to engage the projections on the boss, and thus form a positive connection. This cushioning action of the spring absorbs all shocks and prevents violent fluctuation of the valve actuating device. Fluctuation is further prevented by so arranging the spring that it will be wound tight before the projections on the top plate engage the stops on the boss.

The operation of the mechanism will be readily understood from the foregoing description, and it will be apparent that when rotatory movement is imparted to the governor casing the weighted arms will move outward by centrifugal force, but at all times during this outward movement the weight of the arms will be opposed thereto, and the outward movement of the arms being checked before the arms pass their centers of gravity. Further, it will be apparent that this outward movement of the arms will impart differential movement to the valve actuating device, the first portion of their movement imparting a relatively greater movement to the valve actuating device than is imparted thereto by the last portion of their movement.

While I have shown and described one embodiment of my invention, I wish it to be understood that I do not wish to be limited to the details of construction shown and described, as obvious modifications will occur to a person skilled in the art. And further, I wish it to be understood that while I have shown the invention as applied to a gas engine, that its use is not limited to such engines, but may include steam engines and other engines.

Having thus fully described my invention, what I claim as new and desire to protect by Letters Patent, is:

1. In a governor, a rotatable support, weighted arms pivotally mounted on said support on opposite sides of and at points remote from the axis of rotation of said support and normally inclined toward said axis of rotation, a valve-actuating device arranged adjacent to the axis of rotation of said support, links connecting the respective weighted arms with said valve-actuating device, each of said weighted arms having the axis of its pivotal connection to its link arranged normally on the inner side of a line extending through the axis of the connection of said link to said valve-actuating device and the axis about which said weighted arm moves, said weighted arm being capable of outward movement to bring the first-mentioned axis into alinement with the two last-mentioned axes, said outward movement of said arm being so limited that said first-mentioned axis will not be moved beyond said line in the normal operation of said governor, and a pair of springs connecting said weighted arms one to the other and tending to move them toward the axis of rotation of said support, each of said springs being pivotally connected at its ends with the respective weighted arms.

2. In a governor, a vertically arranged rotatable spindle, a support mounted on and rotatable with said spindle, a valve-actuating device mounted on said spindle and capable of longitudinal movement relatively thereto, two weighted arms pivotally mounted on said support on opposite sides of, and at points remote from, its axis of rotation, each of said weighted arms having inwardly extending portions, links pivotally connected at one end to said inwardly extending portions of said weighted arms and pivotally connected at their opposite ends with said valve-actuating device, said valve-actuating device having outwardly extending lugs to the outer portions of which said links are connected, whereby the point of connection between each link and its weighted arm will lie on the inner side of a line extending through the connection between said link and said valve-actuating device and the axis about which said weighted arm moves, and the greater portion of the weight of said weighted arm will lie on the outer side of said line, said weighted arm being capable of outward movement sufficient to move the point of connection between it and the link into but not beyond said line, and springs pivotally connected at their ends directly to the respective weighted arms.

3. In a governor, a spindle, a support mounted on said spindle, two weighted arms pivotally mounted upon said support on opposite sides of and at points remote from the axis of said spindle, a valve-actuating device movable longitudinally of said spindle, links connecting said valve-actuating device with those portions of the respective arms which lie adjacent to said spindle, the connections between said valve-actuating device and said links being spaced inwardly of the pivots of the arms, the connections between the arms and the links being situated normally between the inclined lines drawn through the pivot of the arms and the connections between said valve-actuating device and said links, a spring connecting said arms, and means to allow the points of connection of the arms with the links to move to coincide with the inclined lines but not pass therebeyond.

4. In a governor, a spindle, a support mounted on said spindle, two weighted arms having axes mounted upon said support on opposite sides of and at points remote from the axis of said spindle, said arms normally inclining inwardly toward said last-mentioned axis with their centers of gravity on the inner sides of the first-mentioned axes, a valve-actuating device movable longitudinally of said spindle, links connecting said valve-actuating device with those portions of the respective arms which lie adjacent to said spindle, means to limit the outward swinging of said arms whereby their centers of gravity never pass outside of the axes of said arms, shafts rotatably mounted on said arms centrally thereof, and springs connecting the adjacent ends of the respective shafts.

5. In a governor, a fluid-tight casing having a bearing in its bottom wall and adapted to contain a quantity of fluid, a boss surrounding said bearing and extending upward beyond the normal level of the fluid within said casing, said boss having laterally extending openings formed in said extensions and extending through the bottom of said casing, a spindle journaled in said bearing, a collar mounted on said spindle above said boss, rods secured to said collar and extending through the openings in the respective lateral extensions of said boss, weights movably mounted within said casing and connections between said weights and said collar.

6. In a governor, a spindle, a casing rotatably mounted on said spindle, weights movably mounted within said casing, a valve actuating device, operative connections between said valve actuating device and said weights, a boss carried by said casing, extending about said spindle and provided on its outer edge with a stop, a disk rigidly secured to said spindle and having a stop extending across the edge of said base and arranged to coöperate with the stop of said boss, and a spring mounted within said boss having one end connected with said casing and having its other end connected with said disk.

7. In a governor, a rotatable casing, a spindle journaled in said casing and having its end projecting beyond the top wall thereof, a valve actuating device mounted within said casing, weights movably mounted within said casing and operatively connected with said valve actuating device, a boss rigidly secured to the top wall of said casing, extending about the upper end of said spindle and having oppositely arranged projections on its upper edge, a disk rigidly secured to the upper end of said spindle and having oppositely arranged projections extending between the projections on said boss and a spring coiled about said spindle within said boss, and secured at one end to said casing and at the other end to said disk.

In testimony whereof, I affix my signature in presence of two witnesses.

ELMER A. WATTS.

Witnesses:
ALBERT K. SMITH,
GEORGE A. BEARD.

Copies of this patent may be obtained for five cents each, by addressing the "Commissioner of Patents, Washington, D. C."